United States Patent Office 2,954,790
Patented Oct. 4, 1960

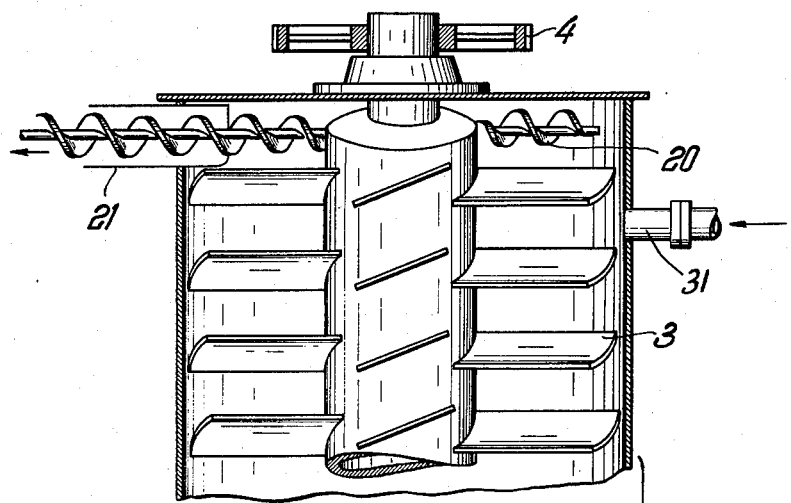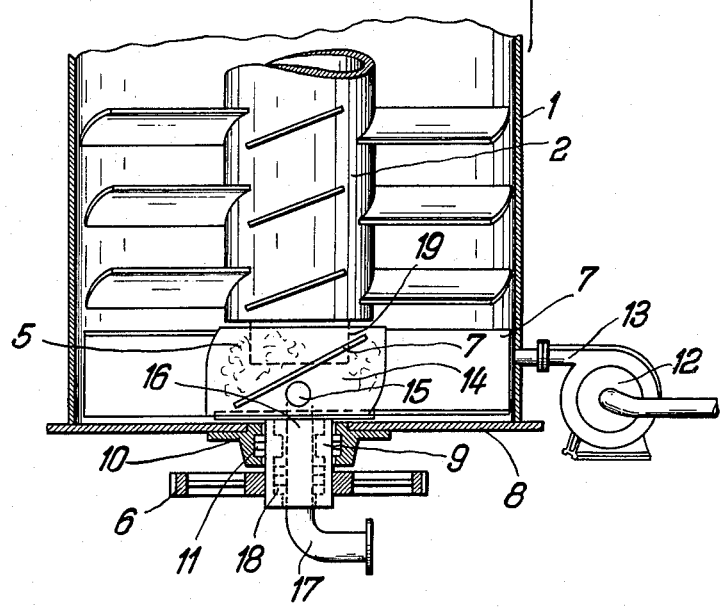

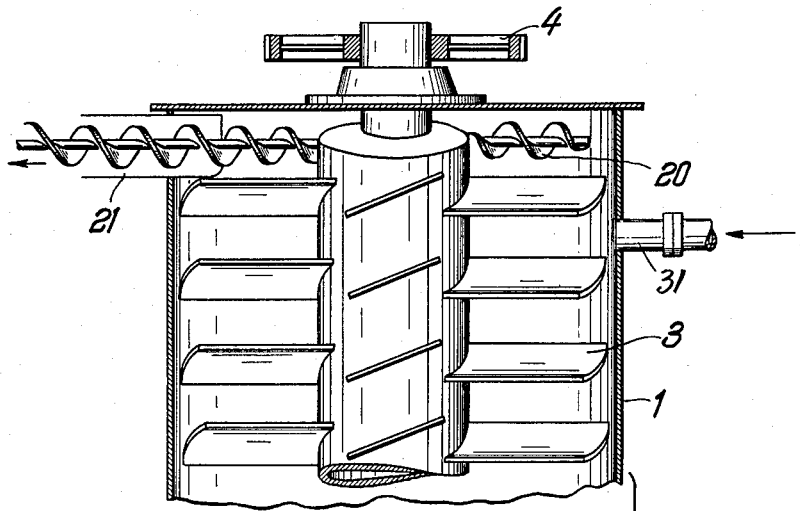
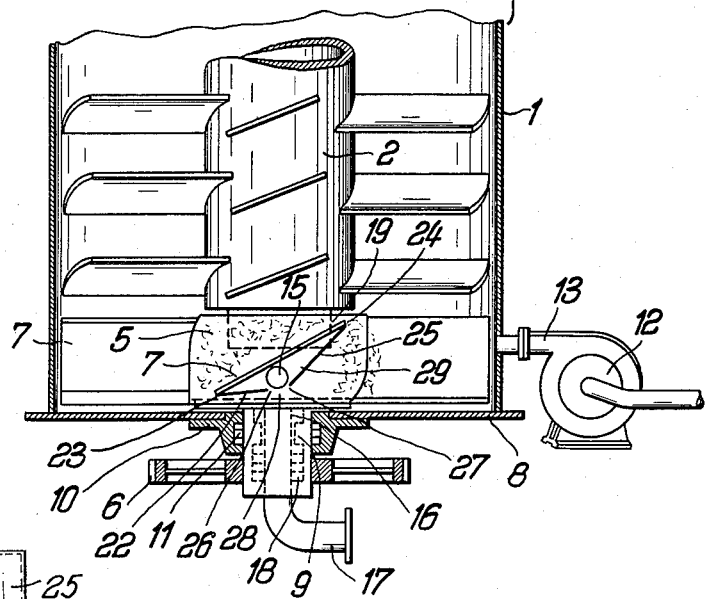
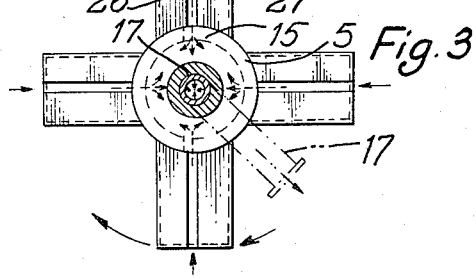

2,954,790

APPARATUS FOR TREATING VEGETABLE AND ANIMAL MATERIALS

Willy Kaether, Braunschweig-Melverode, Germany, assignor to Braunschweigische Maschinenbauanstalt, Braunschweig, Germany Filed Mar. 24, 1958, Ser. No. 723,160

Claims priority, application Germany Mar. 25, 1957

7 Claims. (Cl. 134—132)

The invention relates to an apparatus for extracting, bleaching or washing vegetable and animal materials, for example sugar beet slices, disintegrated sugar cane or cellulose, by means of a liquid, usually water, in which liquid the substance which is to be separated from the material being treated dissolves, or is diffused.

Known apparatus of this kind consists of a container in the form of a tower, in which the material to be treated is passed upwardly from below by means of a conveying device while the treatment fluid is passed in a counter-current downwards through the container from the top and is removed at the bottom through a screen which is placed on the bottom or the side of the tower, and which separates the liquid from the material being treated. A stirring and distributing device, is disposed above the screen and consists of a shaft or hub which rotates in the axis of the tower, and has arms or blades attached thereto. When the apparatus is equipped with a bottom screen, the lower edges of these arms or blades sweep over the screen, whereas when the tower is provided with a lateral screen, the radially outer edges of the arms or wiper plates attached to the arms, sweep over the screen, in order to keep free the openings in the screen for the flow of the liquid through the screen. The disintegrated material to be treated, which has been made capable of being pumped by mixing it with up to 400% of liquid, is pumped into the lower part of the tower.

The conveying liquid is also withdrawn through the screen from the bottom of the tower.

The screen or sieves provided in the known apparatus are very liable to get blocked particularly when treating very finely divided material. As soon as a certain proportion of the surface area of the screen becomes blocked, the damming up of liquid which occurs in the lower part of the tower will prevent satisfactory functioning of the apparatus. The operation of the apparatus must be interrupted to clean the screen and in most cases it is also necessary to dismantle the screen or the distributing device above it. Cleaning itself is a lengthy and complicated operation. Also, in the known apparatus which use bottom screens the screens used, which are plane or slightly conical, are very easily damaged by the foreign bodies which have been carried along with the material to be treated and get between the screens and the wipers which sweep over them. In the known apparatus, the screens and the edges of the wipers extend over a very large diameter. For constructional purposes, it is therefore impossible to make the wipers fit closely against the screen over its entire surface area.

The object of the invention is to construct an apparatus of the above kind which does not have these disadvantages.

In the apparatus of the invention, the liquid is withdrawn, without first passing through a screen, below at least one of the blades, which is inclined at an angle to the axis of rotation of a blade wheel, stirring device, or distributor rotating in the axis of the tower immediately above the bottom, through a radial bore in the hub or shaft of the blade wheel having an outlet below the blade and an axial bore in concentric to the axis of rotation of the hub or shaft. A fixed pipe which extends out of the bottom of the tower is mounted rotatably and water-tightly in this axial bore.

Using a model provided with a transparent casing and an installation of normal size constructed in accordance with the invention, it was found that only a very small proportion of the material being treated gets below the inclined blade, even when this material is such that it does not float on the liquid but sinks slightly. This appears to be due to the flow processes and the relationships between the specific weight of the liquid and the specific weight of the material under treatment. Below the distributor blade a zone is formed which is almost entirely free from the material being treated. The small quantities of the material which are sucked away through the hub of the distributor can be separated from the liquid by known means e.g. pulp extractors, and can either be pumped back into the tower together with the mixture of liquid and new treatment material, or passed directly into the tower after being suitably mashed.

The separating action of the distributor blades can be improved by providing the individual blades with sheet metal covers, one of which extends from the lower edge of each blade more or less horizontally in a direction opposite to the direction of rotation and the other of which extends obliquely downwards in the direction of rotation from the upper edge of the blade, a gap being left free between the lower edges of these covers. The liquid is drawn off from the closed spaces formed by the blades and the covers, these spaces being more or less prism-shaped.

A suction pump may be connected for drawing off the liquid.

To enhance the separating action of the distributing blades, it is advantageous to arrange the hub of the distributor to be rotatable independently of the shaft which carries the other conveying devices, and to drive it at a greater speed of rotation than the aforesaid shaft.

Further details of the invention will be described with reference to the drawing, which shows two constructional examples of the invention. In the drawing:

Fig. 1 shows a vertical section through the tower with the shaft carrying the conveying devices in elevation, for a first form of construction, and Fig. 2 shows a similar view of a second constructional example. Fig. 3 is a plan view of the blades employed in the device.

In both figures of the drawings, the casing of the cylindrical tower is indicated by the numeral 1. A hollow shaft 2, which carries a series of blades 3 one above another and is driven by way of a toothed wheel 4, rotates in the axis of the tower. A hub 5 is provided below the hollow shaft 2 with its blades 3 which extend across the actual treatment zone. The hub 5 is driven independently of the hollow shaft 2 by the toothed wheel 6, and carries the distributing and stirring blades 7. The blades 7 are directly above the floor 8 of the tower. The hub 5 is mounted on a hollow bearing 9 in a flange 10 fixed to the floor 8 of the tower and the hub is sealed by means of a stuffing box 11.

The material to be treated is mixed with liquid and pumped into the lower part of the tower 1 by a pump 12 through a pressure pipe 13. Below the distributing blades 7, a zone 14 is formed, which is practically free from material to be treated and is filled with treatment fluid only. For this purpose, there is provided an inlet pipe 31, through which the treatment liquid is introduced into the upper part of the tower, by appropriate means, not shown. Radial bores 15 in the hub open into a chamber 14 below at least one of the blades 7 and are in communication with an axial bore 16 which is concentric with the axis of rotation of the hub 5. A fixed pipe 17 which leads out of the bottom of the tower 1 is rotatably mounted in the axial bore 16. Stuffing boxes 18 are provided, to form a liquid-tight seal between the pipe 17 and the hub 5 or the bearing 9 connected to the latter. A suction pump which is not illustrated, is connected to the pipe 17 for drawing off the liquid. A device, for separating any particles of treatment material still contained in the liquid drawn off can be fitted in the pipe 17 either before or after the suction pump.

The hollow shaft 2 is rotatably mounted by means of a spigot 19 in the hub 5 of the distributor. The treated material is removed in the customary manner by means of a worm conveyor 20 through a pipe 21 leading from the tower 1. The conveyor screw 20 is disposed above the treatment chamber in which the blades 3 operate.

In the constructional example illustrated in Fig. 2, similar parts are indicated by the same reference numerals as in Fig. 1. In this constructional example, the distributor blades are hollow. For this purpose, sheet metal side blades 22, which extend from the lower edges 23 of the blades 7 and are disposed more or less horizontally in a direction opposite to the direction of rotation, are fixed to the blades 7. In addition, side blades 25 which extend obliquely downwards in the direction of rotation are fixed to the upper edges 24 of the blades 7. Between the lower edges 26 and 27 of the side blades 22 and 25, there remain gaps 28, through which the liquid can enter the hollow spaces 29 enclosed by the blades 7 and the side blades 22 and 25. These hollow spaces 29 are in the form of a prism. The liquid is drawn off through the radial bores 15 and an axial bore 16 of the hub 5. The radial bores 15 open into the hollow spaces 29.

I claim:

1. Apparatus for treating vegetable and animal materials, comprising a tower, means for introducing the material to be treated into the lower part of said tower, means for conveying said material upwardly through said tower, means for admitting a treatment liquid to the upper part of said tower so as to flow in countercurrent to said material, a rotary member adjacent to the bottom of said tower, a blade inclined to the axis of rotation extending from said rotary member, means for rotating said rotary member, a radial bore in said rotary member below said blade and communicating with the interior of said tower, an axial bore in said rotary member communicating with said radial bore and a fixed pipe connected to said axial bore through which liquid may be withdrawn.

2. Apparatus for treating vegetable and animal materials, comprising a tower, means for introducing material to be treated into the lower part of said tower, a central shaft in said tower, blades extending outwardly from said shaft for conveying said material upwardly through said tower, means for rotating said shaft and blades, means for admitting a treatment liquid to an upper part of said tower so as to flow by gravity in countercurrent to said material, a rotary distributor member in said tower adjacent the bottom thereof and below said shaft, at least one blade extending outwardly from said distributor member and inclined to the axis thereof, means for rotating said distributor member, at least one radial bore in said distributor member below said blade communicating with the interior of said tower, an axial bore in said rotary distributor member communicating with said radial bores and a fixed pipe rotatably connected to said axial bore through which liquid may be withdrawn.

3. An apparatus as claimed in claim 2, said blade on said distributor member having a side blade extending downwardly from its upper edge in a direction opposite its direction of rotation and a side blade extending substantially horizontally from its lower edge in the direction of rotation, said radial bore opening into the space formed between said blade and said cover plates.

4. An apparatus as claimed in claim 2, comprising means whereby said central shaft may be rotated independently of said rotary distributor.

5. An apparatus according to claim 2, comprising means for rotating said distributor at a higher speed than said shaft.

6. Apparatus for treating vegetable and animal materials, comprising a tower, means for introducing the material to be treated into the lower part of said tower, means for conveying said material upwardly through said tower, means for admitting a treatment liquid to the upper part of said tower so as to flow in countercurrent to said material, a rotary hub in the lower part of said tower, means for rotating said rotary hub, a plurality of blades extending from said rotary hub and inclined to its axis of rotation, said blades being adjacent the bottom of said tower, radial bores in said rotary hub closely below said blades communicating with the interior of said tower, an axial bore in said rotary hub communicating with said radial bores, and a pipe rotatably connected in a liquid tight manner to said axial bore through which liquid may be withdrawn from said tower.

7. An apparatus as claimed in claim 6, said blade having a side blade extending downwardly from its upper edge in a direction opposite its direction of rotation and a side blade extending substantially horizontally from its lower edge in the direction of rotation, said radial bore opening into the space formed between said blade and said cover plates.

References Cited in the file of this patent

UNITED STATES PATENTS

| | | |
|---|---|---|
| 2,086,181 | Bonotto | July 6, 1937 |
| 2,212,559 | Ehret | Aug. 27, 1940 |
| 2,240,227 | Saussure | Apr. 29, 1941 |
| 2,828,230 | Heinrich | Mar. 25, 1958 |